United States Patent [19]
Carter

[11] 3,954,507
[45] May 4, 1976

[54] THERMOCOUPLES USED FOR MEASURING TEMPERATURES

[76] Inventor: Dennis Ephraim Carter, 8, 2nd Avenue, Bez. Valley Johannesburg, Transvaal, Johannesburg, South Africa

[22] Filed: June 3, 1974

[21] Appl. No.: 475,893

[30] Foreign Application Priority Data

June 13, 1973  South Africa.......................... 73/4002
June 29, 1073  South Africa.......................... 73/4437
Aug. 3, 1973  South Africa.......................... 73/5307
Jan. 3, 1974  South Africa.......................... 74/0050
Feb. 15, 1974  South Africa.......................... 74/1016

[52] U.S. Cl................................ 136/233; 29/573; 73/DIG. 9; 136/201; 136/234; 136/236 A; 136/237
[51] Int. Cl.²........................................ H01L 35/10
[58] Field of Search ........... 136/234, 201, 236, 237, 136/233; 73/DIG. 9, 359; 29/573

[56] References Cited
UNITED STATES PATENTS

| | | | |
|---|---|---|---|
| 1,259,372 | 3/1918 | Davey.................................. | 136/234 |
| 3,069,752 | 12/1962 | Shgrning.............................. | 29/573 |
| 3,154,501 | 10/1964 | Hertz................................... | 136/201 |
| 3,392,439 | 7/1968 | Sonnenschein........................ | 29/573 |
| 3,477,122 | 11/1969 | Hamrick............................... | 29/573 |
| 3,785,947 | 1/1974 | Baldwin et al........................ | 136/234 |
| 3,816,183 | 6/1974 | Kraus.................................... | 136/234 |

FOREIGN PATENTS OR APPLICATIONS

518,388  11/1955  Canada............................. 136/234

*Primary Examiner*—T. H. Tubbesing
*Assistant Examiner*—Richard E. Berger
*Attorney, Agent, or Firm*—Oblon, Fisher, Spivak, McClelland & Maier

[57] ABSTRACT

This invention relates to thermocouple hot junction members which are used in immersion thermocouple assemblies employed for measuring the temperature of molten metal. At the temperatures involved, which are over 1200°C and often in the region of 1800°C and more, noble metals and alloys thereof have to be used to form a thermocouple conductor pair and up to now these have been united at the hot junction by a spot weld.

In the hot junction of this invention the weld is replaced by a conductive refractory powder bridge so that the thermocouple conductor elements do not have to be joined. Each thermocouple conductor element is located in a leg of a quartz glass U-tube and the refractory powder bridge is located in the base of the U-tube so that opposed ends of the conductor elements are embedded in the powder which forms a thermocouple junction.

Advantages which flow from the invention includes a simpler manner of construction of the hot junction member and also greater freedom of choice of the metals forming the thermocouple pair.

5 Claims, 1 Drawing Figure

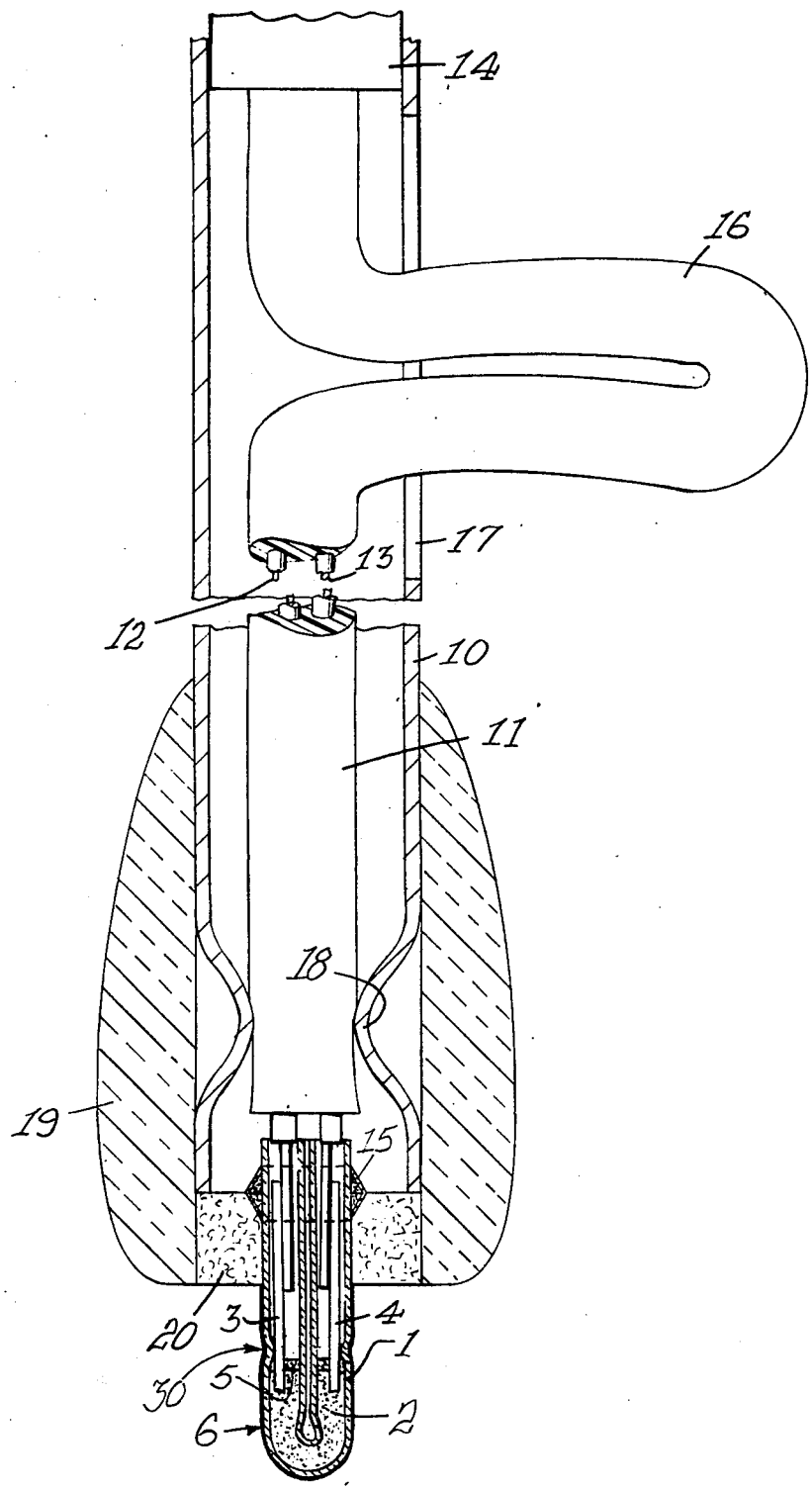

THERMOCOUPLES USED FOR MEASURING TEMPERATURES

This invention relates to an immersion thermocouple used for measuring the temperature of molten metal.

Immersion thermocouple devices are available for measurement of temperatures of up to 1800°C and more. At temperatures in the region of 1000°C base metals and alloys thereof can be used in the thermocouple hot junction but where measurements in the region of 1200°C and above are required thermocouple conductor elements containing platinum, rhodium, tungsten and rhenium are commonly used.

It will be appreciated that with the use of noble or precious metals, such as platinum, commercial considerations require that the thermocouple elements be made as thinly as possible. Even so precious metal thermocouples are relatively costly and have only a limited life. Usually but a single temperature measurement can be taken with the present devices, and it will be appreciated that in enterprises such as the steel making industry, where large numbers of high temperature measurements are made annually a material cost is involved. Moreover the precious metal thermocouples in particular are difficult to manufacture especially in that the thin wires are difficult to unite at the hot junction end of the device and the failure rate of such devices is somewhat high.

Furthermore thermocouple hot junctions for immersion thermocouples have, up to the present time, usually involved a welding together of the thermocouple wires in order to unite them. Where noble metals are concerned the wires may be less than 0.1 mm in diameter and after the welding step the junction must be annealed so that it is flexible enough to allow the wire pair to be fed into a U-tube. It will be appreciated that the above method is time consuming and difficult as well as costly.

In addition the use of alloys in a thermocouple wire pair brings about its own problems and difficulties. Thus special alloys have to be used which permit the formation of a weld junction and this limits the range of thermocouple wire pairs that can be selected when the wires are matched for weldability but not for maximum thermocouple effect or optimum useful life. Also at the high temperatures involved the wires are often subject to diffusion effects through the hot junction so that there is a tendency to equalize the alloys and alter the thermocouple effect.

This is also possible due to a selective vapourization of alloy constituents at high temperatures so that again incorrect readings may be given by a thermocouple after a period.

Because of the above difficulties present day thermocouples used for temperature measurement of molten steel, are constructed with a view to only a single use.

It is an object of the present invention to provide a thermocouple which will minimise at least some of the above difficulties experienced with the present devices.

According to the invention a thermocouple hot junction member includes thermocouple conductor elements, a tubular jacket for the conductor elements, and bridge means comprising a conductive refractory powder mass within the jacket forming a thermocouple junction for opposed ends of the conductors.

Further according to the invention the bridge means is a high melting electrically conductive material in particulate form selected from the class comprising tungsten, tungsten carbide and carbon. The preferred material for the formation of the bridge means is tungsten powder but as an alternative carbon in the form of a graphite powder may be used.

Also according to the invention the thermocouple conductor elements may be any thermocouple pair suitable for measuring temperatures above 1200°C. A preferred pair consists of pure tungsten wire on the one side and pure platinum wire on the other side.

The conductors being pure metals are not subject to change in composition through diffusion or vaporization and the hot junction device can accordingly be used over and over again. Even if the conductors used are alloys diffusion does not affect the useful life of the thermocouple and alloys can be selected so that vaporisation effects are minimised.

The manufacture of the thermocouple hot junction of the invention is greatly simplified in that a weld between the conductors is not required, which in itself is of great advantage, and further brittle weld junctions which have to be annealed and which are liable to fracture on insertion of the conductors into a U-tube are avoided.

Also thermocouple pairs may be selected which would not be selected at present due to the difficulty of joining the wires at the hot junction.

In the manufacture of the hot junction device of the invention the thermocouple conductors are first located in the tubular jacket which is in the form of a U-tube. The powdered electrical bridge means is then introduced into the tubular jacket so that the opposed ends of the conductors become embedded in the powdered electrical bridge material. In this way a fully adequate electrical contact between the thermocouple conductors is formed simply, rapidly, and relatively inexpensively. Thereafter a small quantity of quartz powder is located on top of the powdered electrical bridge material.

Also according to the invention the jacket for the conductor elements is a quartz glass tube. Preferably the jacket is a U-tube having one conductor of the conductor pair in each leg thereof and the bridge means located in the base portion of the tube.

Still further according to the invention the hot junction member includes a protective refractory material coating for the tubular jacket thereof. For example a graphite cement coating may be used to enhance the durability of the hot junction member.

The hot junction member of the invention is capable of enduring several immersions in molten metal and should therefore be mounted on a lance which is likewise capable of repeated immersion at least at its hot end.

Further according to the invention therefore there is provided a lance adapted for repeated immersions in molten metal slag, the lance including a bore to receive cable leads and a ceramic fibre insulation covering for the lance at one end thereof, the ceramic fibre insulation covering providing a socket within which a thermocouple hot junction may be located on cable leads in the bore of the lance.

The invention also includes within its scope a thermocouple assembly including a lance, cable leads extending within the lance from an electrical connector at one end of the lance to a thermocouple hot junction at the other end, the cable leads being connected to the conductor elements of the hot junction, means to permit longitudinal movement of the cable leads and thereby partially retract the hot junction member into the lance and permit a ceramic fibre wool plug to be located within the lance about the junction between the cable leads and the hot junction member, and a ceramic fibre insulation covering for the lance at its end adjacent the hot junction member, the ceramic fibre insulation providing a socket within which the thermocouple hot junction is located. Such assembly preferably incorporates the above referred to hot junction member.

In order to illustrate the invention an example will now be described with reference to the accompanying drawing which is a section through portion of an immersion thermocouple assembly employing a hot junction member according to the invention.

Referring to the drawing a hot junction for a thermocouple is constituted in part by a quartz glass U-tube 1 in which there is located a plug or bridge 2 comprising a mass of electrically conductive tungsten particles. In one limb of the U-tube jacket 1 there is inserted a pure tungsten thermocouple wire 3 and in the other limb of the jacket there is inserted a pure platinum thermocouple wire 4, the opposed ends of the wires being embedded in the tungsten powder 2 so that at the operating temperature a good electrical contact and thus a good thermocouple junction is made between the wires without a weld junction having to be formed. In each limb of the U-tube jacket there is a layer of powdered quartz glass 5 above the tungsten powder 2 to resist oxidation of the tungsten at the operating temperature. Also to contain the bridge material 2 and quartz glass 5 the U-tube has a crimp zone 30 formed therein by heating the U-tube and at the same time drawing a vacuum so as to reduce the pressure in the legs of the tube. In this way a constriction of the bore of the U-tube is formed in each leg just above the powdered quartz glass 5 and the latter as well as the bridge material is held in place.

The above described hot junction member is intended to endure several immersions in the molten metal within a furnace and to provide protection for the quartz glass U-tube 1, the latter is thinly coated with a graphite cement layer 6. This layer may be applied between dips to replace any graphite cement that may dissolve in the molten metal.

The thermocouple hot junction forms part of an immersion thermocouple assembly constituted in part by a metal lance 10 within which is located a compensating cable 11. The cable leads 12 and 13 can be of copper or a suitably formulated alloy to provide an appropriate adjustment of the E.M.F. generated by the selected thermocouple conductor pair 3, 4 and these leads extend from a connector 14 for suitable instrumentation (not shown) at the cold end of the lance to bared ends at the hot end of the lance.

In order to mount the hot junction member on the lance 10 the bared ends of leads 12 and 13, which are slightly splayed, are pinched together and inserted one into each leg of the U-tube 1. In this way the U-tube becomes firmly mounted on the cable 11 and the leads 12 and 13 automatically make contact with the thermocouple elements 3 and 4 respectively in view of the limited space within the legs of the U-tube 1. Since the U-tube 1 becomes very hot when immersed in molten metal there is a tendency for the legs of the tube to splay and to prevent this ferrule 15 is located around the jacket so as to embrace both legs thereof.

The hot junction member is mounted on the cable 11 when the bared leads 12 and 13 thereof extend forwardly beyond the hot end of the lance. Thereafter the cable 11 is moved longitudinally to retract the leads and hot junction member mounted thereon to a position as shown in the drawing. This is done by making a loop 16 of cable which is allowed to project from a slot 17 in the lance 10 and contracting the loop. Naturally to advance the cable again the loop 16 is simply expanded until its front leg engages the forward end of slot 17. A constriction 18 in the lance 10 engages the cable 11 so that it is stabilised and the hot junction member is not likely to be shaken loose.

Ceramic fibre insulation 19 is provided for the hot end of the lance so as to extend slightly beyond its end thereby providing a socket in which the hot junction member is to be located. When the hot junction is mounted on the compensating leads and the cable 11 is retracted so that the hot junction is located in the position as shown, a ceramic fibre wool plug 20 is used to seal the end of the lance.

When the thermocouple is required to penetrate a surface of hard slag a protective metal cap (not shown) is cemented to the end of the ceramic fibre insulator 19. The cap protects the thermocouple from mechanical damage yet melts away quickly in the molten metal to expose the thermocouple.

I claim:

1. A thermocouple hot junction member including thermocouple conductor elements, a tubular jacket for the conductor elements, and bridge means comprising a conductive, refractory powder mass within the jacket forming a thermocouple junction for opposed ends of the conductors, the bridge means possessing a sufficiently high melting temperature to retain its powder form at temperatures in excess of 1200°C.

2. The thermocouple hot junction of claim 1 in which the bridge means is powdered tungsten.

3. The thermocouple hot junction of claim 1 in which the jacket for the conductor elements is a quartz glass tube.

4. The thermocouple of claim 3 in which the jacket is a U-tube having one conductor of the conductor pair in each leg thereof and the bridge means located in the base portion of the tube.

5. A thermocouple hot junction member including thermocouple conductor elements, a quartz glass U-tube having one of the conductor elements of the conductor pair in each leg thereof, a mass of powdered tungsten located in the base portion of the tube and forming a thermocouple junction for opposed ends of the conductors, and a refractory material layer in each limb of the U-tube above the level of tungsten powder therein.

* * * * *